US008458705B2

(12) United States Patent
Jun et al.

(10) Patent No.: US 8,458,705 B2
(45) Date of Patent: Jun. 4, 2013

(54) METHOD AND APPARATUS FOR PREVENTING THE OMISSION AND REPEATED EXECUTION OF SCHEDULE INFORMATION DUE TO A TIME CHANGE

(75) Inventors: Hae-Young Jun, Anyang-si (KR); Ji-Eun Keum, Suwon-si (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1192 days.

(21) Appl. No.: 11/958,242

(22) Filed: Dec. 17, 2007

(65) Prior Publication Data
US 2008/0148267 A1    Jun. 19, 2008

(30) Foreign Application Priority Data
Dec. 15, 2006 (KR) .................. 10-2006-0128764

(51) Int. Cl.
*G06F 9/46* (2006.01)
*H04B 1/38* (2006.01)
*G04B 19/22* (2006.01)

(52) U.S. Cl.
USPC ............ 718/102; 718/100; 368/121; 455/566

(58) Field of Classification Search
None
See application file for complete search history.

(56) References Cited

U.S. PATENT DOCUMENTS

| 6,502,121 | B1 * | 12/2002 | Threlkeld ..................... 718/100 |
| 6,587,398 | B1 * | 7/2003 | Mock et al. ..................... 368/21 |
| 7,472,388 | B2 * | 12/2008 | Fukunari et al. ............. 718/100 |
| 7,499,715 | B2 * | 3/2009 | Carro et al. ................ 455/456.3 |
| 7,500,259 | B2 * | 3/2009 | Tsukamoto et al. ........... 725/44 |
| 7,587,327 | B2 * | 9/2009 | Jacobs et al. ................. 705/7.14 |
| 2002/0038234 | A1 * | 3/2002 | Fu et al. .......................... 705/8 |
| 2002/0098857 | A1 * | 7/2002 | Ishii ........................... 455/502 |
| 2002/0177442 | A1 * | 11/2002 | Nagashima .................. 455/435 |
| 2002/0181333 | A1 * | 12/2002 | Ito et al. ........................ 368/21 |
| 2003/0054325 | A1 * | 3/2003 | Miller et al. ................. 434/108 |
| 2003/0067844 | A1 * | 4/2003 | Liaw ............................. 368/47 |
| 2003/0191795 | A1 * | 10/2003 | Bernardin et al. ............ 709/105 |
| 2003/0233654 | A1 * | 12/2003 | Tsukamoto et al. ........... 725/41 |
| 2005/0028158 | A1 * | 2/2005 | Ferguson et al. ............. 718/100 |
| 2006/0068812 | A1 * | 3/2006 | Carro et al. ................ 455/456.3 |
| 2006/0136121 | A1 * | 6/2006 | Eisen ........................... 701/200 |
| 2008/0168127 | A1 * | 7/2008 | Hernandez ................... 709/202 |
| 2009/0049445 | A1 * | 2/2009 | Shu et al. ..................... 718/102 |

* cited by examiner

*Primary Examiner* — Meng An
*Assistant Examiner* — Tammy Lee
(74) *Attorney, Agent, or Firm* — Jefferson IP Law, LLP

(57) ABSTRACT

Provided is a method and apparatus for managing a schedule of a terminal based on a local time. It is possible to prevent schedule information from a schedule of a terminal from being repeatedly processed or from being missed, when the local time changes due to the movement of the terminal into another time zone or due to daylight saving time. It is also possible to manage a schedule by determining if the schedule has changed during a period between a time before the change and the changed time.

11 Claims, 5 Drawing Sheets

METHOD AND APPARATUS FOR PREVENTING THE OMISSION AND REPEATED EXECUTION OF SCHEDULE INFORMATION DUE TO A TIME CHANGE

PRIORITY

This application claims the benefit under 35 U.S.C. §119 (a) of a Korean patent application filed on Dec. 15, 2006 in the Korean Industrial Property Office and assigned Serial No. 2006-0128764, and the entire disclosure of which is hereby incorporated by reference.

BACKGROUND OF THE INVENTION

1. Field of the Invention

The present invention relates to the processing of schedule information stored within a terminal. More particularly, the present invention relates to a method for preventing missed schedule information and repeatedly executed schedule information according to a change of local time in a portable terminal.

2. Description of the Related Art

Conventional portable terminals support scheduling services for processing schedule information when a preset time arrives. The schedule information may be input either through an external server or may be directly input by a user.

FIG. 1 is a flowchart of a conventional procedure of processing a schedule within a terminal according to the prior art. In step S101, a schedule is set either by an external server or by a user. The schedule may be set by setting a "Timer/Base" indicating the time for execution of a schedule, a "Timer/Rule" indicating a repeated execution condition (e.g. every day or every week), and a task to be executed when the preset time is identical with the condition that is set. Herein, the task may include information input in order to access a specific site and download content when a preset time and condition are satisfied. Alternatively, the task may be to alarm the user that the time and condition have been satisfied. In step S102, it is determined if the set scheduling is active. As a result of the determination in step S102, when the set scheduling is active, it is determined if the input schedule satisfies the set time and condition in step S103. As a result of the determination in step S103, when the input schedule satisfies the set time and condition, the input task is executed in step S104. In step S105, it is determined if an effective period and repeated execution frequency of the schedule have expired. For example, the input schedule may be repeatedly reported to a user up to a predetermined number of times during a specific time period. When each of the determination steps is not satisfied, each step is repeatedly performed. As a result of the determination in step S105, when the effective period and repeated execution frequency of the schedule have expired, the input schedule service is terminated. However, when the local time changes due to the movement of a terminal into another area or due to the application of daylight saving time, a reference time that is used as a standard by which to compare the inputted schedule time, is changed into the modified local time either by an external server or through direct input by a user. In this case, when the reference time was changed into the time in the earlier time zone prior to the time change, information of the schedule already executed may be repeatedly processed. When the reference time is changed into the time of a new time zone that is later than the time before the change, schedules to be executed during the time that is skipped are missed.

Therefore, a need exists for a method and apparatus for input schedule management when a reference time within a terminal is changed according to a local time.

SUMMARY OF THE INVENTION

An aspect of the present invention is to address at least the above-mentioned problems and/or disadvantages and to provide at least the advantages described below. Accordingly, an aspect of the present invention is to provide a method for managing a schedule which is repeatedly executed or missed when reference time within a terminal is changed due to a change in the local time.

Also, exemplary embodiments of the present invention provide a terminal for processing schedules according to a changed reference time.

In accordance with an aspect of the present invention, there is provided a method for managing a schedule of a terminal based on a local time, the method comprising determining if the local time changes; if the local time changes to an earlier time, determining if there is schedule information that has already been processed that will be processed again as a result of the local time change; if the local time changes to a later time, determining if there is unprocessed schedule information that was to be processed during a period between the changed local time and the local time before the change of the local time; and preventing an already-processed schedule information from being processed again and reporting the unprocessed schedule information to a user.

In accordance with another aspect of the present invention, there is provided an apparatus for managing a schedule based on a local time, the apparatus including a storage device for storing information for the schedule; and a controller for changing time within a terminal after receiving a changed local time when the local time changes, recognizing the changed time, and determining if the schedule inputted in the storage device is to be executed.

In accordance with yet another aspect of the present invention, there is provided an apparatus for managing a schedule based on a local time, the apparatus comprising a storage device for storing information for the schedule; and a controller for changing time within a terminal after receiving a changed local time when the local time changes, recognizing the changed time, and determining if the schedule inputted in the storage device is to be executed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
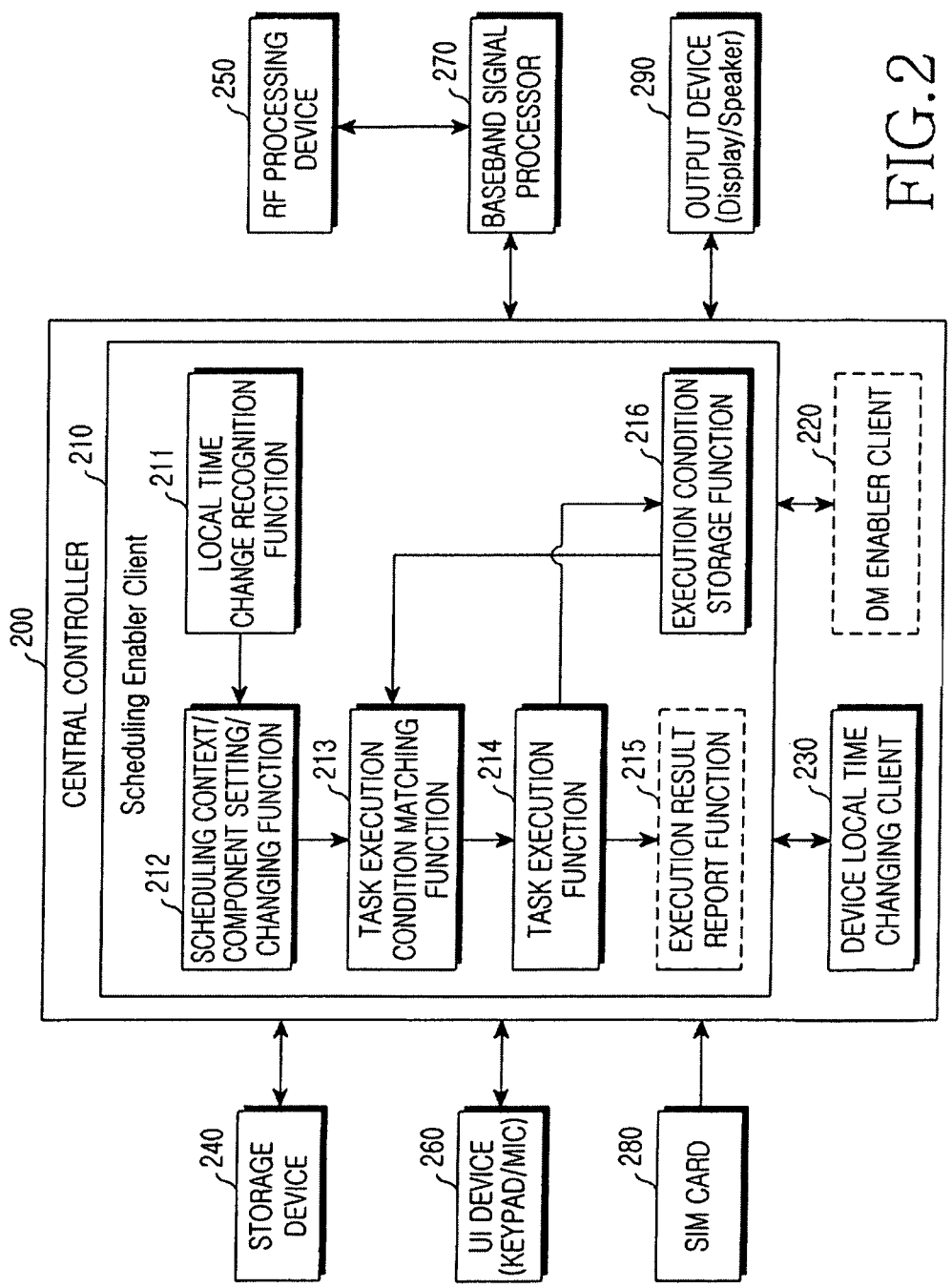
FIG. 2 is a block diagram showing a block diagram of the internal construction of a terminal according to an exemplary embodiment of the present invention.

Hereinafter, a block diagram of the internal construction of a terminal according to an exemplary embodiment of the present invention will be described with reference to FIG. 2. The terminal includes a central controller 200, a storage device 240 for storing schedule information and a parameter related to a scheduling service, a UI device 260 for interfacing with a user such as a keypad and a microphone, a SIM card 280 containing user information, an output device 290 for delivering information to a user, such as a display and a speaker, a baseband signal processor 270 for processing audio and data signals, and an RF processing device 250 for converting and transmitting baseband signals into RF signals or for converting received RF signals into baseband signals. Herein, the central controller 200 includes a scheduling enabler client 210 for processing schedule information, a device management (hereinafter, referred to as DM) enabler client 220 for communicating with an external server, and a device local time changing client 230 for receiving a local time change through a user's input or by a wire/wireless protocol and changing the time within the terminal. The scheduling enabler client 210 includes a scheduling context/component setting/changing function 212 for setting and changing both a task to be executed and a condition for execution of a corresponding task, a task execution condition matching function 213 for determining if an input schedule is identical with the condition for execution of the task, a task execution function 214 for actually executing tasks, an execution result report function 215 for notifying an execution result either to a server or to a user, a local time change recognition function 211 for recognizing a reference time change of a terminal according to the local time, and an execution condition storage function 216 for storing a condition and time for a task executed according to the condition. In this case, there may exist one or both of the local time change recognition function 211 and the execution condition storage function 216 according to exemplary embodiments. Moreover, the execution result report function 215 and the DM enabler client 220 may be omitted in some exemplary embodiments.

Figure 3:
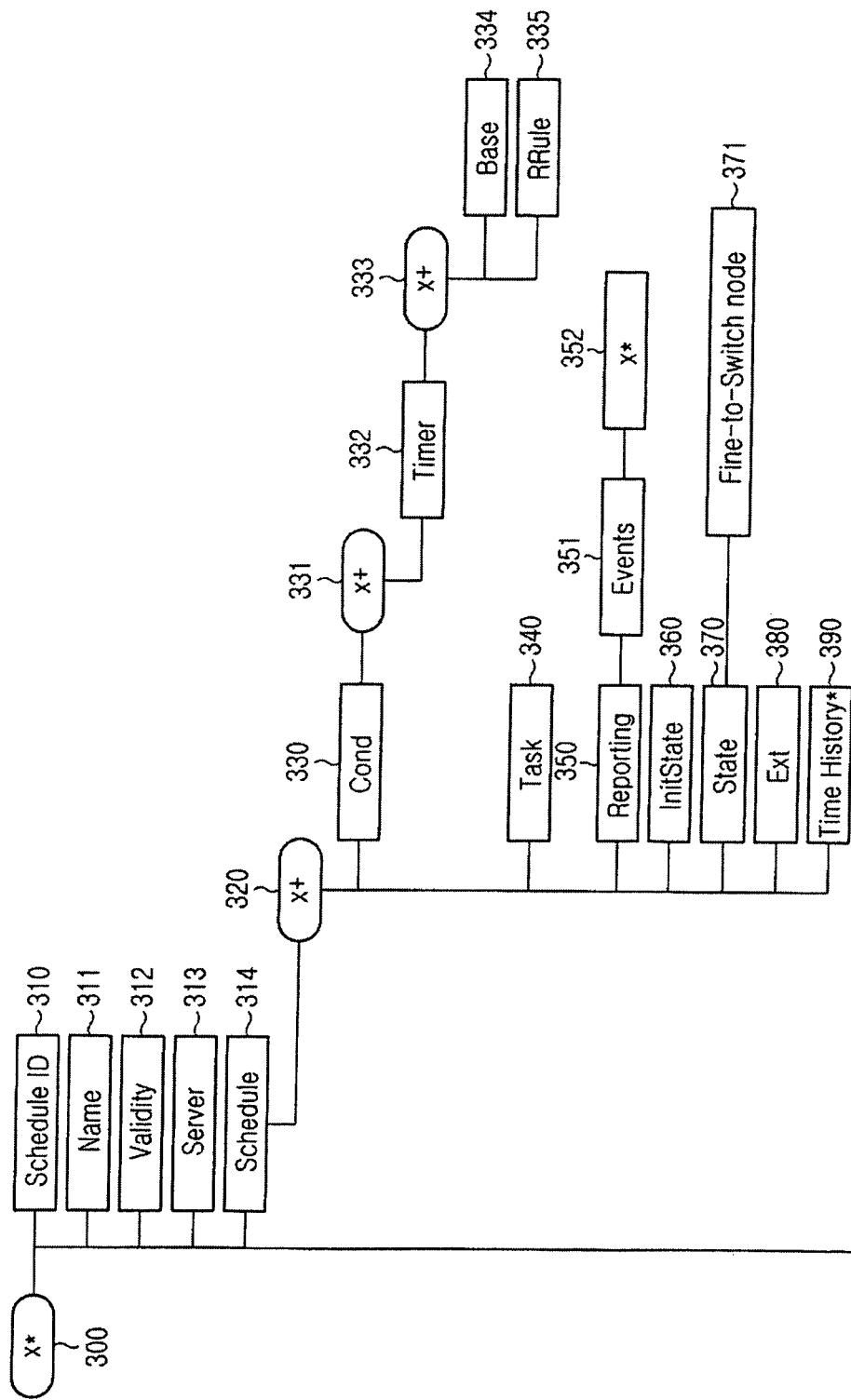
FIG. 3 is an illustration showing a management object according to an exemplary embodiment of the present invention.

A Management Object (MO) within a terminal to which an exemplary embodiment of the present invention is applied will be described with reference to FIG. 3. The MO includes target nodes for delivering or acquiring setting values and measurement values from an external server that is managing a terminal to the terminal, or for transmitting the values from the terminal to the external server. Herein, the nodes may be regarded as a unit element which individually contains schedule related information. In the following description, a node identified by the attached sign "*" implies that it includes no node or many nodes, and a node identified by the attached sign "+" implies that it includes one or more nodes. First, an X* node 300 is the highest super-node indicating schedule information, a name of which can be optionally determined. The name of this node is determined as soon as the node is generated within the terminal. The Schedule ID 310 is a specific name for identifying a schedule, which is not repeatedly used for another schedule in one terminal. A Name node 311 identifies a schedule name that a user can recognize, and a Validity node 312 identifies an expiration period of schedule information. A Server node 313 indicates an identifier so as to identify a corresponding server communicating with a terminal, and a Schedule node 314 identifies an upper node of the current scheduling components. It can be said that one schedule node is constituted by scheduling components having a relation and probability between them. Hereinafter, sub-nodes of the schedule node will be described. The X+ node 320 identifies each schedule component, a name of which is also determined as soon as the node is generated. A Cond node 330 identifies a condition for the execution of the schedule information. The X+ node 331 identifies each condition component, a name of which is also determined as soon as the node is generated. The X+ node 331 has a Timer node 332 related to time as a sub-node of the X+ node 331. The X+ node 333 identifies each timer component, a name of which is also determined as soon as the node is generated. As sub-nodes of the Timer node 332, the X+ node 333 has a Base node 334 indicating reference time of a time condition, and an RRule node 335 indicating a condition for repeated execution (e.g. every day or every week). In this case, only if all conditions for the sub-nodes of the Timer node 332 are satisfied, a corresponding Task 340 is executed. In addition, the target nodes include a Reporting node 350 sending a condition for the report to a server and an Events node 351 setting a reporting condition event as a sub-node of the Reporting node 350. The X* node 352 identifies each events component, a name of which is also determined as soon as the node is generated. The target nodes include an InitState node 360 representing an initial state at the time of schedule component generation, and a State node 370 representing a current state either by an active state or an inactive state. The Time-to-Switch node 371, which is a sub-node of the State node 370, may include a time difference value between the changed time and the time before the change. In this case, when the time difference value counted down according to the passage of time becomes zero, the state of the State node 370 is changed into an active state or an inactive state. Moreover, the Time-to-Switch node 371 stores information on the time before the change, and thus changes the state of the State node 370 either into an active state or an inactive state, which will be described in more detail with reference to FIG. 4. Ext nodes 315 and 380 denote extension nodes to be optionally extended according to the need of a mobile network operator, and a Time History* node 390 stores the condition and time information for execution of the task executed according to the satisfaction of an input schedule condition. Through the Time History* node 390, it is possible to confirm if a schedule during the period between time before the change and changed time has been already executed.

Hereinafter, a reference time change will be described with reference to FIGS. 2 and 3. Cases where the reference time for processing schedule information within a terminal is changed according to a change of local time may include two cases. First, when a reference time is changed into a time that is later than the time with respect to the time before the change, schedule information to be generated during the time period there between is checked. Then, unprocessed and missed schedules are reported to a user for processing of the missed schedule information. That is, the Timer node 332 is checked so as to determine if there is a schedule set to be generated during the period between time before the change and time after the change. As a result of the determination, when there is unprocessed and missed schedule information, the missed schedule information is reported to a user for the processing of the missed schedule information. Second, when the reference time within a terminal is changed into time that is earlier than the time prior to the change, repeated schedule information is checked. The above-described case where the reference time is changed into time that is earlier than the time prior to the change will be described with reference to FIGS. 4 and 5.

Figure 1:
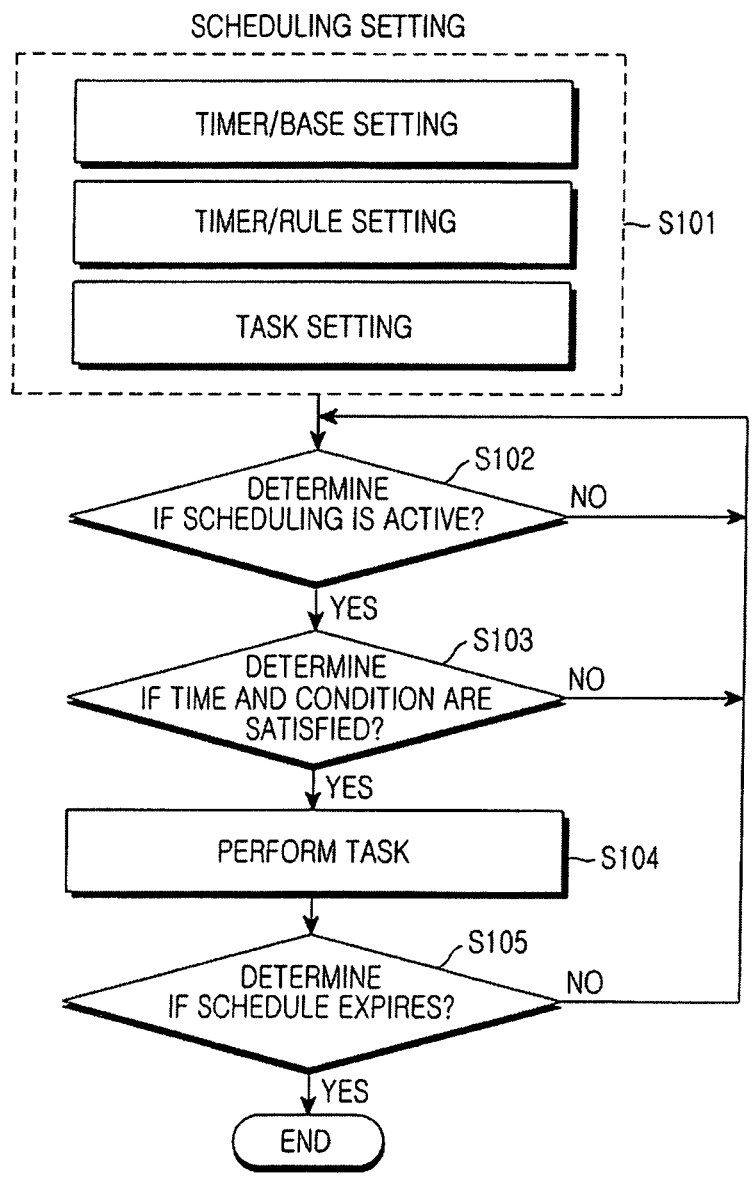
FIG. 1 is a flowchart of a conventional procedure of processing a schedule within a terminal.
Figure 4:
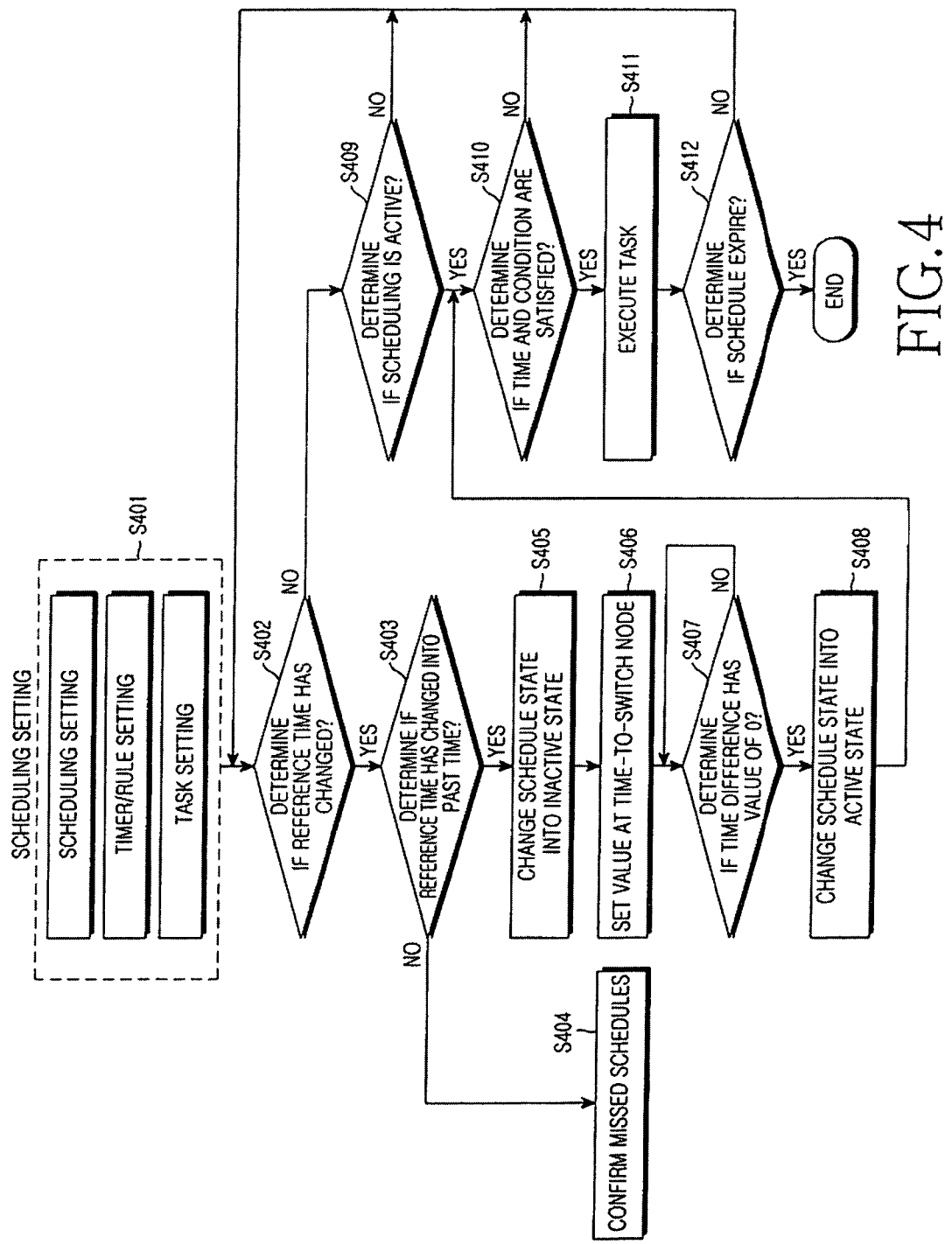
FIG. 4 is a flowchart of a procedure of executing a schedule according to a first exemplary embodiment of the present invention.

FIG. 4 is a flowchart of a procedure of executing a schedule according to a first exemplary embodiment of the present invention. When the reference time of schedule information to be processed within a terminal according to a local time is changed into time in earlier than the time before the change, time information of a schedule already processed has been stored. Therefore, it is possible to determine if the information of the schedule already processed is to be repeatedly executed. That is, time information of a schedule is stored in a Time History* node 390 of the terminal whenever the schedule is processed. In FIG. 4, the first step S401 is a step of setting a schedule, description of which will be omitted since step S401 is identical with step S101 in FIG. 1. When an external server or a user changes a reference time within a terminal due to local time change, the reference time of the terminal is changed by the device local time changing client 230. In this case, a message, indicating that reference time of the terminal has been changed, is reported to the scheduling enabler client 210. In step S402, the local time change recognition function 211 of the central controller 200 within the terminal determines if the reference time within the terminal has changed according to the local time. In this case, when the message transmitted from the device local time changing client 230 is confirmed, the local time change recognition function 211 recognizes that the reference time within the terminal has been changed. As a result of the determination of step S402, when the local time change recognition function 211 does not recognize that the reference time has changed, the local time change recognition function 211 proceeds to step S409. Since the procedure from step S409 to step S412 is identical with that from step S102 to S106, a detailed description thereof will be omitted. Hereinafter, a case of a changed reference time within a terminal will be described. The local time change recognition function 211 recognizes that the reference time within the terminal has been changed. In step S403, the local time change recognition function 211 determines either if the reference time has been changed into a past time (i.e. a time that is earlier than the time before the change) or if the reference time has been changed into a future time (i.e. time that is later than the time before the change). As a result of the determination in step S403, when the reference time has been changed into a past time, the local time change recognition function 211 proceeds to step S405. When the reference time has been changed into a future time, schedules missed during the period between the time before the change and time after the change are checked so as to determine if the missed schedules are to be executed, in step S404. When the reference time has been changed into a past time, a state of a schedule to be executed during the period between the time before the change and changed reference time is changed into an inactive state in order to prevent any tasks already processed from being repeatedly executed, in step S405. In step S406, a time difference value between the time before the change and the time after the change is calculated in order to set the calculated time difference value at the Time-to-Switch node 371, i.e. a sub-node of the State node 370. Herein, the calculated time difference value stored in the Time-to-Switch node 371 denotes the time remaining before the state of the schedule becomes the active state. In step S407, it is determined if the time difference value counted down according to the passage of time becomes zero. As a result of the determination in step S407, when the time difference has a value of zero, the schedule state is changed into the active state in step S408. Then, step S410 is performed, and then the steps subsequent to step S410 are performed (the steps subsequent to step S410 have already been described above with reference to FIG. 1). For example, when the local time changes from 7 A.M to 4 A.M, the time difference value of three hours between 7 A.M and 4 A.M is set and is counted down in the Time-to-Switch node 371. Then, a state of the schedule for three hours is changed into the inactive state, and thus the schedule is not executed. After three hours, that is, when the value input to the Time-to-Switch node 371 becomes zero through a counting down, the State node 370 representing the schedule state is changed again from the inactive state to the active state. Therefore, the alarm, which is set to ring at 5 A.M on every day, rings at 5 A.M once, and the alarm does not ring again on the day after in which the reference time was changed from 7 A.M to 4 A.M. After that day, the alarm rings at the corresponding time.

In another embodiment, the time before the change (hereinafter, referred to as absolute time), instead of the time difference value, is input as a value set in the Time-to-Switch node 371. When the changed reference time becomes the absolute time through a counting down, the schedule in an inactive state is changed into an active state. That is, when local time changes from 7 A.M to 4 A.M, a value to be set in the Time-to-Switch node is set to 7 A.M (i.e. absolute time). Then, the reference time within the terminal is set to 4 A.M according to the changed local time. When the reference time counted down becomes 7 A.M (i.e. the absolute time), the schedule state is changed into the active state through a confirmation of the absolute time, which will be described in more detail with reference to FIG. 5.

Figure 5:
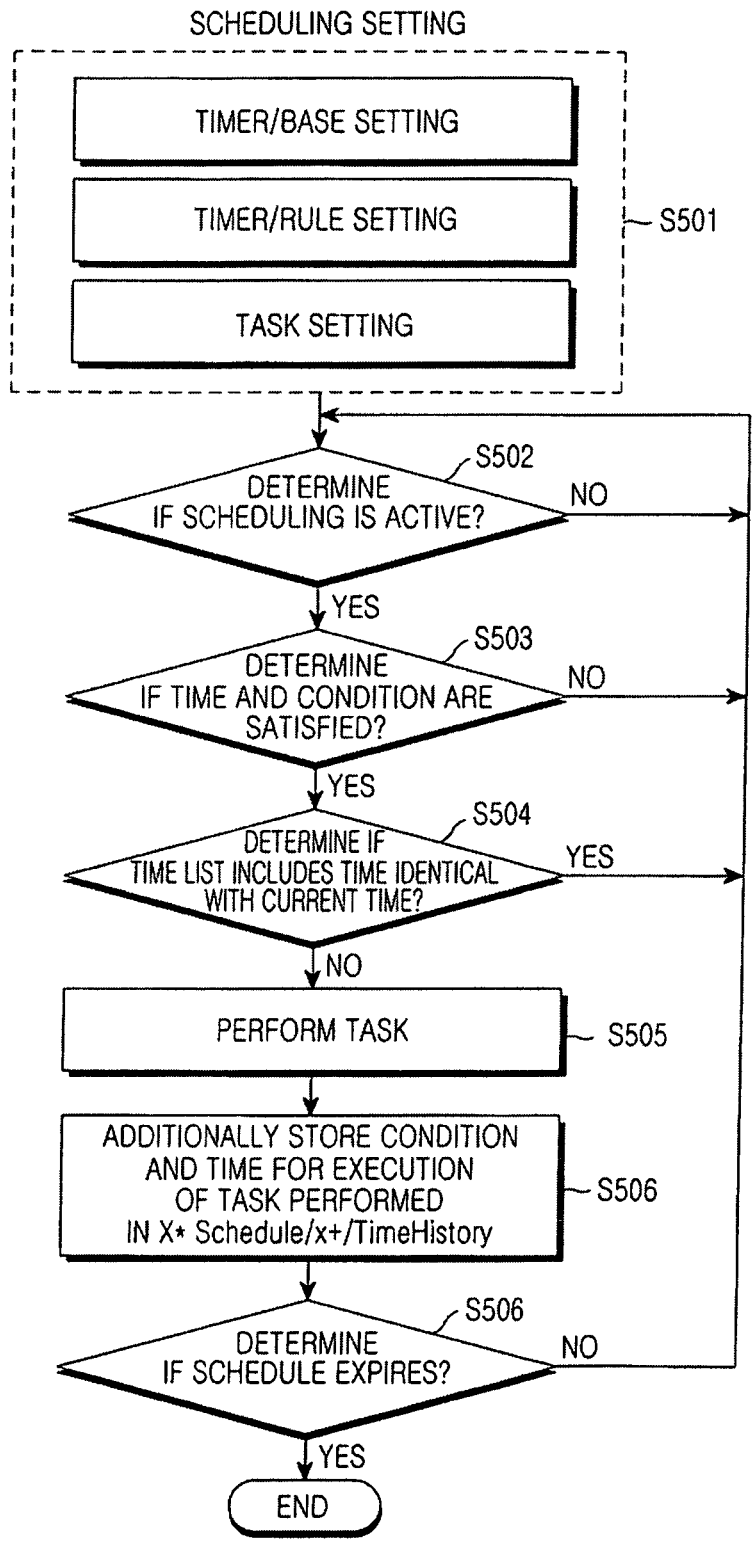
FIG. 5 is a flowchart of a procedure of executing a schedule according to a second exemplary embodiment of the present invention.

FIG. 5 is a flowchart showing a procedure of executing a schedule according to a second exemplary embodiment of the present invention. The matched condition and execution time for the task already executed are pre-stored in the Time History* node 390. First, the step S501 is a step of setting a task and schedule information for execution of a schedule, as in the case of step S101 of FIG. 1. In step S502, it is determined if the set scheduling is active. As a result of the determination in step S502, when the set schedule is active, it is determined if the input schedule satisfies the set time and condition in step S503. As a result of the determination in step S503, when the input schedule satisfies the time and condition, it is determined if the set time and condition are identical with the value stored in the Time History* node 390 in step S504. As a result of the determination in step S504, when the set time and condition are not identical with the value pre-stored the Time History* node 390, a corresponding task is executed since the input schedule is not a repeatedly generated schedule, in step S505. In step S506, the execution condition and execution time of the task performed in step S505 are additionally stored in the Time History node* 390. In step S507, it is determined if the effective period and repeated execution frequency of the schedule have expired. When each of the determination steps are not satisfied, each step is repeatedly performed. As a result of the determination in step S507, when the effective period and repeated execution frequency of the schedule have expired, the input schedule service is finally terminated.

According to exemplary embodiments of the present invention, when a reference time within a terminal is changed due to a change in the local time, it is possible to manage a schedule so as to prevent omission and repeated generation of schedule information.

Certain aspects of the present invention can also be embodied as computer readable code on a computer readable recording medium. A computer readable recording medium is any non-transitory data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing a clock and a schedule of a terminal that executes entries of the schedule based on a local time in a location of the terminal, wherein the terminal comprises a controller, the method comprising:
    monitoring, by the controller, the local time in the location of the terminal;
    determining, by the controller, if an original local time in the terminal is different from the monitored local time;
    changing a local time in the clock of the terminal to be the same as the monitored local time;
    determining, by the controller, if there is a schedule entry that has already been processed according to the original local time and will be processed again according to the changed local time;
    determining, by the controller, if there is an unprocessed schedule entry that was to be processed during a period between the changed local time and the original local time; and
    preventing, by the controller, an already-processed schedule entry from being processed again and reporting the unprocessed schedule entry to a user,
    wherein the preventing comprises changing, by the controller, a schedule state for the schedule from an active state, in which schedule entries are processed, to an inactive state, in which the schedule entries are not processed.

2. The method as claimed in claim 1, further comprising storing, by the controller, a time difference value corresponding to a time between the changed local time and the original local time, and changing, by the controller, the schedule state of the schedule from the inactive state to the active state when the time difference value counted down becomes zero.

3. The method as claimed in claim 1, further comprising, if the changed local is earlier than the original local time, storing, by the controller, an absolute time corresponding to the original local time, and changing, by the controller, the schedule state for the schedule from the inactive state to the active state when the changed local time becomes the same as the original local time.

4. The method as claimed in claim 1, further comprising storing, by the controller, a processed time and a condition for the already-processed schedule entry.

5. The method as claimed in claim 1, wherein the controller determines whether there is a schedule entry that has already been processed according to the original local time when the changed local time is earlier than the original local time.

6. The method as claimed in claim 1, wherein the controller determines whether there is an unprocessed schedule entry that was to be processed during the period between the changed local time and the original local time when the changed local time is later than the original local time.

7. An apparatus for managing a schedule based on a local time, the apparatus comprising:
    a non-transitory memory for storing information for the schedule; and
    a controller for monitoring the local time in a location of a terminal, determining whether the monitored local time is different from an original local time within the terminal, changing a local time within the terminal for managing the schedule to be the same as the monitored local time, recognizing the changed local time, determining whether the schedule stored in the memory is to be executed, and executing the schedule according to the determination and preventing an already-processed schedule entry from being processed again,
    wherein the preventing comprises changing, by the controller, a schedule state for the schedule from an active state, in which schedule entries are processed, to an inactive state, in which the schedule entries are not processed.

8. The apparatus as claimed in claim 7, wherein the controller further comprises a device management enabler client for communicating with an external server.

9. The apparatus as claimed in claim 7, wherein the memory stores a time difference value between the changed local time and the original local time.

10. The apparatus as claimed in claim 7, wherein the memory separately stores the original local time.

11. The apparatus as claimed in claim 7, wherein the memory stores a time and a condition according to which the schedule is to be executed.

* * * * *